United States Patent [19]

Shioi et al.

[11] Patent Number: 4,753,968

[45] Date of Patent: Jun. 28, 1988

[54] PROCESS FOR PREPARING MICROCAPSULES

[75] Inventors: Shunsuke Shioi, Ikoma; Kazuyuki Shinmitsu, Osaka; Masanao Tajiri, Amagasaki; Makoto Miyake, Ashiya, all of Japan

[73] Assignee: Kanzaki Paper Manufacturing Co. Ltd., Tokyo, Japan

[21] Appl. No.: 886,071

[22] Filed: Jul. 16, 1986

[30] Foreign Application Priority Data

Oct. 25, 1985 [JP] Japan .................... 60-240146

[51] Int. Cl.$^4$ .............................................. C08K 9/00
[52] U.S. Cl. .................................. 523/208; 264/4.7; 427/212
[58] Field of Search ............... 523/200, 201, 202, 208

[56] References Cited

U.S. PATENT DOCUMENTS

| | | | |
|---|---|---|---|
| 4,013,606 | 3/1977 | Ballweber | 525/157 |
| 4,251,386 | 2/1981 | Saeki et al. | 252/388 |
| 4,594,370 | 6/1986 | Adkins | 523/508 |
| 4,598,111 | 7/1986 | Wright | 525/157 |

*Primary Examiner*—Christopher Henderson
*Attorney, Agent, or Firm*—Murray and Whisenhunt

[57] ABSTRACT

In a microencapsulation process which comprises polycondensating a hydrophilic melamine-formaldehyde resin type precondensate in water or in a hydrophilic medium containing an emulsifier to form capsule wall film around a hydrophobic core material to obtain microcapsules, the process which is characterized in that the emulsifier is a copolymer of (1) an unsaturated monobasic acid monomer of at least 80 mole %, (2) a hydrophobic monomer and (3) a hydrophilic monomer other than a carboxylic acid.

10 Claims, No Drawings

PROCESS FOR PREPARING MICROCAPSULES

The invention relates to a process for preparing microcapsules containing a hydrophobic core material and having extremely excellent properties.

In recent years, the microencapsulation techniques have made a remarkable progress and the area for use of the microencapsulated products has been expanded greatly over a very wide field including the pressure sensitive manifold paper.

As for the manufacturing method of microcapsules, it is known that there are various methods such as the coacervation method, interfacial polymerization method, and in-situ polymerization method. In particular, various method have been proposed for manufacturing microcapsules having wall film of melamine-formaldehyde resin, because said resin has excellent water resistance and solvent resistance. For examples, U.S. Pat. Nos. 4,100,103, 4,328,119, 4,406,816, 4,413,843, Japanese Unexamined Patent Publication Nos. 49984/1979, 15660/1980, 47139/1980, 51431/1980, 51238/1981, 100629/1981, 102934/1981, 121628/1981, 103891/1982, etc have proposed as methods for depositing melamine-formaldehyde resin polycondensates in water or other hydrophilic medium around hydrophobic core materials.

Though many encapsulation methods have been developed and proposed, these methods still have a great deal to be improved because some of the following drawbacks are accompanying:

(1) Because of poor emulsifying ability of the emulsifier used, fine microcapsules are hardly prepared. Thus, when using these microcapsules, a pressure sensitive manifold paper is obtained which is very apt to be stained.

(2) If the emulsifier brings an emulsion poor in the stability, large oil droplets are apt to form and cause spot smudges when the microcapsule is applied to pressure sensitive manifold paper.

(3) Depositing efficiency of wall forming material on the core material surface is poor and fails to provide sufficient retainability of the core material.

(4) These methods are susceptible to subtle change of the properties such as polymerization degree, molecular weight distribution, copolymerization ratio, and modification degree of the water soluble high molecular compound used as the emulsifier for the core material, and are apt to produce variations in quality such as wall film strength, in industrial-scale preparation when using different lot of materials.

(5) In case when the wall forming material deposited on the surface of core material is a mixture of melamine-formaldehyde resin precondensate having good water resistance and a polymer of poor water resistance, only capsules of poor water resistance can be obtained.

An object of the invention is to provide a process for preparing microcapsules which is free from the above-mentioned drawbacks.

An object of the invention is to provide a process for preparing microcapsules which are fine and excellent in core material retainability and have a good distribution of particle size.

The above and other objects of the invention will become apparent from the following description.

In a microencapsulation process which comprises polycondensating a hydrophilic melamine-formaldehyde resin type precondensate in water or in a hydrophilic medium containing an emulsifier to form capsule wall film around a hydrophobic core material to obtain microcapsules, the present invention provides a process which is characterized in that the emulsifier is a copolymer of (1) an unsaturated monobasic acid monomer of at least 80 mole%, (2) a hydrophobic monomer and (3) a hydrophilic monomer other than a carboxylic acid.

The unsaturated monobasic acid monomer, one component of the present emulsifier, is an unsaturated compound having one carboxyl group in a molecule and includes acrylic acid, methacrylic acid, crotonic acid, etc. Among them, acrylic acid or methacrylic acid is particularly preferably used, since an emulsifier obtained therefrom gives microcapsules having more excellent core material retainability.

The hydrophobic monomer is an unsaturated compound having a hydrophobic group and includes ethylene, propylene and like $C_{2\sim4}$ olefins; styrene, vinyltoluene, α-methylstyrene and like $C_{8\sim10}$ styrenes; vinyl acetate, vinyl propionate, vinyl pivalate and like $C_{4\sim7}$ vinyl esters; acrylonitrile; methacrylonitrile; methyl acrylate, ethyl acrylate, propyl acrylate, butyl acrylate, octyl acrylate, methyl methacrylate, ethyl methacrylate, butyl methacrylate and like $C_{1\sim8}$ alkyl (meth)acrylates; dimethyl itaconate, dihexyl itaconate and like di($C_{1\sim6}$ alkyl)itaconates; etc. Among these compounds, preferable are $C_{1\sim8}$ alkyl (meth)acrylates, more preferable are $C_{1\sim4}$ alkyl (meth)acrylates and especially preferable are $C_{3\sim4}$ alkyl (meth)acrylates.

Examples of useful hydrophilic monomer other than a carboxylic acid are vinylbenzenesulfonic acid, 2-acrylamide-2-methyl-propanesulfonic acid, vinylsulfonic acid or like sulfonic acids; acrylamide, methacrylamide or like amides; dimethylaminoethyl methacrylate, dimethylaminopropyl methacrylate, dimethylaminoethyl acrylate, dimethylaminopropyl acrylate, dimethylaminopropyl methacrylamide, dimethylaminopropyl acrylamide or like amines; vinylphosphonic acid or like organic phosphonic acids; etc. Among these compounds, acrylamide, methacrylamide and like amides and dimethylaminoethyl acrylate, dimethylaminoethyl methacrylate and like amines are preferably used, since they give extremely excellent capsules.

The specific emulsifier used in the invention is a copolymer containing the above three components as essential components and has a feature of containing at least 80 mole% of the unsaturated monobasic acid monomer. Preferable emulsifier contains 80 to 98.5 mole% of the unsaturated monobasic acid monomer, 15 to 1 mole% of the hydrophobic monomer and 18 to 0.5 mole% of the hydrophilic monomer other than a carboxylic acid, and this emulsifier gives microcapsules which are fine and excellent in core material retainability and have a good distribution of particle size.

Further, the emulsifier contains more preferably 85 to 97 mole%, most preferably 90 to 96 mole% of the unsaturated monobasic acid monomer, more preferably 10 to 2 mole%, most preferably 8 to 3 mole% of the hydrophilic monomer and more preferably 10 to 1 mole%, most preferably 6 to 1 mole% of the hydrophilic monomer other than a carboxylic acid. The last emulsifier is most preferable since it provides microcapsules which are fine and extremely excellent in core material retainability and have an extremely excellent distribution in particle size. The emulsifier used in the invention has a molecular weight of preferably about 10,000 to 1,000,000.

In the invention, when required, it is possible to use conjointly an anionic, nonionic, cationic or ampholytic high molecular or low molecular weight emulsifier other than the present emulsifier.

The emulsifiers are preferably contained in water or in a hydrophilic medium in an amount of 0.1% (by weight, same as hereinafter) or more, more preferably 0.3% or more and most preferably 0.5 to 5% from the points of easiness of preparation and stability of the emulsion. The upper limit of the usage, which is determined depending on the viscosity of the system, the capsule preparing apparatus, etc., is generally 20%.

In the invention, the hydrophilic melamine-formaldehyde resin type precondensate includes melamine-formaldehyde resin precondensate, methylated product thereof, modified products with other amines, phenols, aldehydes or anionic-, cationic- or nonionic-modifier, etc.

The above amines include urea, thiourea, alkylurea, ethyleneurea, acetoguanamine, benzoguanamine, guanidine, dicyandiamide, biuret and cyanamide. Examples of useful phenols are phenol, cresol, xylenol, resorcinol, hydroquinone, pyrocatechol and pyrogallol. Examples of aldehydes are acetaldehyde, paraformaldehyde, hexamethylenetetramine, glutaraldehyde, glyoxal and furfural. Examples of the anionic modifiers are sulfamic acid, sulfanilic acid, glycollic acid, glycine, acid sulfites, phenol sulfonate and taurine. Examples of the cationic modifiers are diethylenetriamine, triethylenetetramine, tetraethylenepentamine and dimethylaminoethanol. Examples of the nonionic modifiers are ethylene glycol and diethylene glycol.

These amines, phenols, aldehydes, anionic-, cationic- or nonionic-modifier can be used in an amount of preferably less than one mole, more preferably less than 0.5 mole and most preferably less than 0.3 mole per mole of melamine in the melamine-formaldehyde resin type precondensate, in order to obtain microcapsules having an excellent core material retainability.

Though the above various compounds can be used as the hydrophilic melamine-formaldehyde resin type precondensate, melamine-formaldehyde resin precondensate and methylated product thereof are most preferably used which provide fine and minute wall film.

The hydrophilic melamine-formaldehyde resin type precondensate is used in a suitable amount depending on the kinds of the hydrophobic core material, use of the capsules, etc., but is generally used in an amount of 2 to 40 parts by weight in terms of melamine, more preferably 4 to 30 parts by weight per 100 parts by weight of the hydrophobic core material.

In the invention, the hydrophilic melamine-formaldehyde resin type precondensate can be added to the system in any stage, before, during or after the emulsification of the hydrophobic core material in water or a hydrophilic medium. However, in case the precondensate is added after the hydrophobic core material is emulsified, it is preferable to continue the emulsification of the core material after the addition of the precondensate.

In the invention, although the precondensate can be added to the system at a temperature which is not particularly limited, it is preferable to maintain the system during the addition at 65° C. or higher, more preferably at 70° C. or higher and most preferably at 80° C. or higher in order to obtain microcapsules having an improved core material retainability.

The capsules of the invention can be prepared at a suitable condition which is not particularly limited depending on the use thereof. It is, however, preferable to maintain the reaction system at a pH of up to 5.0 and at least 60° C. for more than 2 hours. Microcapsules having an extremely high quality can be obtained when the system is maintained at a pH of up to 4.0 and at least 80° C. for more than 2 hours.

According to the invention, to keep the reaction system acidic, is used an acid catalyst such as formic acid, acetic acid, citric acid, oxalic acid, p-toluene-sulfonic acid, hydrochloric acid, sulfuric acid and phosphoric acid which are generally used in the aminoaldehyde resin manufacture.

Examples of the hydrophobic core material to be used as the inclusion of the capsules according to the invention are:

liquids insoluble or substantially insoluble in water typified by animal oils such as fish oil and lard oil; vegetable oils such as olive oil, peanut oil, linseed oil, soybean oil and castor oil; mineral oils such as petroleum, kerosine, xylene and toluene; synthetic oils such as alkylated diphenylalkane, alkylated naphthalene, biphenylethane, methyl salicylate, diethyl adipate, di-n-propyl adipate, di-n-butyl adipate, dimethyl phthalate, diethyl phthalate, di-n-propyl phthalate, di-n-butyl phthalate and di-n-octyl phthalate; or solutions of electron donating organic chromogenic materials, electron accepting reactant materials, ligand compounds, and organic metal salts dissolved in the above synthetic oils; water insoluble metal oxides and salts; fibrous materials such as cellulose and asbestos; water insoluble synthetic polymers; minerals; pigments; glasses; perfumes; spices; sterilizer composition; physiological composition; fertilizer compositions; flame retardant; thermochromic material; liquid crystal; toner material; etc.

The microcapsules obtained by the method of the invention can be made into a capsule powder by filtration, washing, drying, spray-drying; or by the method disclosed in Unexamined Japanese patent publication No. 238141/1985 which comprises adding an aldehyde type resin forming material to a capsule dispersion, polycondensating the resin forming material and then removing the dispersion medium; etc.

The invention will be described in greater detail with reference to the following Examples. It should not be understood, however, that this will limit the present invention. Unless otherwise specified, "parts" and "%" used in the Examples and Comparison Examples are all by weight.

EXAMPLE 1

Into 100 parts of alkylnaphthalene was dissolved 4 parts of 3,3-bis(p-dimethylaminophenyl)-6-dimethylaminophthalide (crystal violet lactone) to obtain an inner-phase solution.

Separately, an aqueous solution which is prepared by dissolving with heating 3 parts (as solids) of, as an emulsifier, a copolymer of acrylic acid/n-butyl acrylate/acrylamide (molar ratio 90/6/4) into 200 parts of water was placed into a vessel equipped with a stirrer and heater, and was adjusted to pH 5 with 20% aqueous caustic soda solution to give an aqueous medium for preparing microcapsules.

The above inner-phase solution was emulsified in the aqueous medium heated at 85° C. to obtain an emulsion containing particles 3.5$\mu$ in average size.

A melamine-formaldehyde resin precondensate heated at 60° C. and prepared by reacting with heating 30 parts of 37% aqueous solution of formaldehyde and 10 parts of melamine was added with stirring to the above emulsion maintained at 85° C., and the emulsion was reacted at 80° C. for 2 hours. After adjusting a pH of the system to 3.8 with dropwise addition of 0.05N-hydrochloric acid, the emulsion was further reacted at 85° C. for 5 hours to prepare a microcapsule dispersion.

To the microcapsule dispersion was added 50 parts of starch powder. Water was added thereto in such amount as to achieve 20% solid concentration, whereby microcapsule-containing coating composition was obtained. The coating composition was applied by an air-knife coater to a paper substrate weighing 40 g/m$^2$ in an amount of 4 g/m$^2$ (as solids) to obtain a top sheet.

EXAMPLE 2

A microcapsule dispersion and a top sheet were prepared in the same manner as in Example 1 with the exception of using, as an emulsifier, a copolymer of acrylic acid/n-butyl acrylate/2-acrylamide-2-methylpropanesulfonic acid (molar ratio 90/6/4).

EXAMPLES 3 TO 14

Twelve kinds of top sheets were prepared in the same manner as in Example 1 except that 3 parts (as solids) of each copolymer listed in Table 1 was used as an emulsifier in place of the emulsifier used in Example 1.

EXAMPLE 15

A top sheet was prepared in the same manner as in Example 1 except that 24.3 parts (as solids) of hexamethoxyhexamethylolmelamine ("Cymel 300", a product of Mitsui Toatsu Chemicals, Inc.) was used as a capsule wall forming material in place of the melamine-formaldehyde resin precondensate used in Example 1.

COMPARISON EXAMPLES 1 TO 3

Three kinds of top sheets were prepared in the same manner as in Example 1 except that 3 parts (as solids) of each homopolymer or copolymer listed in Table 1 was used as an emulsifier in place of the emulsifier used in Example 1.

COMPARISON EXAMPLE 4

An aqueous solution which is prepared by dissolving with heating 6 parts (as solids) of, as an emulsifier, a copolymer of acrylic acid/n-butyl acrylate/acrylamide (molar ratio 90/6/4) into 200 parts of water was placed into a vessel equipped with a stirrer and heater. Into the solution were dissolved with stirring 10 parts of urea and 1 part of resorcin, and the solution was adjusted to pH 3.7 with 20% aqueous caustic soda solution to give an aqueous medium for preparing microcapsules.

An inner-phase solution obtained by dissolving 4 parts of crystal violet lactone into 100 parts of alkylnaphthalene was emulsified in the aqueous medium heated at 50° C. to obtain an emulsion containing particles 3.5μ in average size.

To the emulsion were added 200 parts of 1.0% aqueous solution of ammonium chloride and then 26 parts of 37% aqueous solution of formaldehyde with continuous stirring. The mixture was heated to 60° C. and reacted with stirring at the same temperature for one hour to obtain a capsule dispersion.

A top sheet was prepared in the same manner as in Example 1 with use of the above capsule dispersion.

EVALUATION

Preparation of an Under Sheet

A 65-parts quantity of aluminum hydroxide, 20 parts of zinc oxide, 15 parts of molten mixture (80/20) of zinc 3,5-di(α-methylbenzyl)salicylate and α-methylstyrene/styrene copolymer, 5 parts (as solids) of aqueous solution of polyvinyl alcohol and 300 parts of water were pulverized by a ball mill for 24 hours to obtain a dispersion. To the dispersion was added 20 parts (as solids) of carboxy-modified styrene/butadiene copolymer latex to prepare an color acceptor coating composition. The coating composition was applied by an air-knife coater to a paper substrate weighing 40 g/m$^2$ in an amount of 5 g/m$^2$ (as solids) to obtain an under sheet.

Heat resistance

On the above under sheet was superposed each of top sheets of Examples 1 to 15 and Comparison Examples 1 to 4 and the assembly was heated at 100° C. for 3 hours. The color density on the under sheet was measured by a spectrophotometer (Model UVIDEC-505, product of Japan Spectroscopic Co., Ltd., Japan) in terms of reflectivity at a wavelength of 600 mμ to evaluate core material retainability. The results were given in Table 1. The larger the value, the better is core material retainability.

In the Table

90~100: no problem in practical use
80~90: almost no problem in practical use
70~80: usable but not for all use
below 70: unsuited for practical use Compression resistance On the above under sheet was superposed each of top sheets of Examples 1 to 15 and Comparison Examples 1 to 4 and the assembly was pressed under a load of 20 kg/cm$^2$ for 30 seconds. The color density on the under sheet was measured by the same spectrophotometer as above in terms of reflectivity at a wavelength of 600 mμ to evaluate size and distribution of capsule particles. The results were given in Table 1. The larger the value, the more fine and sharp is the particle in size and distribution respectively.

In the Table

90~100: no problem in practical use
82~90: almost no problem in practical use
75~82: usable but not for all use
below 75: unsuited for practical use

TABLE 1

| | Example No. | | | | | | | | | |
|---|---|---|---|---|---|---|---|---|---|---|
| | 1 | 2 | 3 | 4 | 5 | 6 | 7 | 8 | 9 | 10 |
| Acrylic acid | 90 | 90 | 90 | 92 | 92 | 96 | 83 | 87 | | |
| Methacrylic acid | | | | | | | | | 92 | |
| Crotonic acid | | | | | | | | | | 92 |
| Vinyl acetate | | | | | | | | | | |
| Acrylonitrile | | | | | | | | | | |

TABLE 1-continued

|  | 1 | 2 | 3 | 4 | 5 | 6 | 7 | 8 | 9 | 10 |
|---|---|---|---|---|---|---|---|---|---|---|
| Ethyl acrylate |  |  |  |  |  |  | 10 | 8 | 4 | 4 |
| n-Propyl acrylate |  |  | 6 |  |  |  |  |  |  |  |
| n-Butyl acrylate | 6 | 6 |  | 5 |  |  |  |  |  |  |
| n-Butyl methacrylate |  |  |  |  | 5 | 3 |  |  |  |  |
| 2-Acrylamide-2-methyl-propanesulfonic acid |  | 4 |  |  |  |  |  |  |  |  |
| Acrylamide | 4 |  | 4 |  |  |  |  |  | 4 | 4 |
| Methacrylamide |  |  |  |  |  | 1 |  |  |  |  |
| Dimethylaminoethyl methacrylate |  |  |  | 3 | 3 |  | 7 | 5 |  |  |
| Heat resistance | 96.9 | 85.4 | 95.6 | 96.7 | 96.6 | 96.9 | 75.3 | 86.2 | 96.2 | 72.0 |
| Compression resistance | 95.5 | 92.3 | 95.4 | 96.3 | 95.3 | 93.0 | 85.5 | 92.0 | 95.8 | 84.2 |

|  | Example No. | | | | | Com. Example No. | | | |
|---|---|---|---|---|---|---|---|---|---|
|  | 11 | 12 | 13 | 14 | 15 | 1 | 2 | 3 | 4 |
| Acrylic acid | 90 | 90 | 90 | 87 | 90 | 100 | 83 | 75 | 90 |
| Methacrylic acid |  |  |  |  |  |  |  |  |  |
| Crotonic acid |  |  |  |  |  |  |  |  |  |
| Vinyl acetate |  |  | 6 |  |  |  |  |  |  |
| Acrylonitrile | 6 |  |  |  |  |  |  |  |  |
| Ethyl acrylate |  | 6 |  |  |  |  |  |  |  |
| n-Propyl acrylate |  |  |  |  |  |  |  |  |  |
| n-Butyl acrylate |  |  |  | 4 | 6 |  | 17 | 21 | 6 |
| n-Butyl methacrylate |  |  |  |  |  |  |  |  |  |
| 2-Acrylamide-2-methyl-propanesulfonic acid |  |  |  |  |  |  |  |  |  |
| Acrylamide | 4 | 4 | 4 | 9 | 4 |  |  | 4 | 4 |
| Methacrylamide |  |  |  |  |  |  |  |  |  |
| Dimethylaminoethyl methacrylate |  |  |  |  |  |  |  |  |  |
| Heat resistance | 85.2 | 83.2 | 81.2 | 88.0 | 96.0 | 95.6 | 40.2 | 42.5 | 60.0 |
| Compression resistance | 79.3 | 80.2 | 78.2 | 90.0 | 95.2 | 60.0 | 78.9 | 78.8 | 80.0 |

We claim:

1. In a microencapsulation process which comprises polycondensating a hydrophilic melamine-formaldehyde resin type precondensate in water or in a hydrophilic medium containing an emulsifier to form capsule wall film around a hydrophobic core material to obtain microcapsules, the improvement comprising the emulsifier is a copolymer of
   (1) 85–97 mole % of an unsaturated monobasic acid monomer selected from the group consisting of acrylic acid and methacrylic acid;
   (2) 2–10 mole % of a hydrophobic monomer selected from the group consisting of $C_{1\sim 8}$ alkyl (meth)acrylates; and
   (3) 1–10 mole % of a hydrophilic monomer other than a carboxylic acid which is at least one compound selected from the group consisting of sulfonic acids, amides, amines and organic phosphonic acids.

2. A process as defined in claim 1 wherein the hydrophobic monomer is $C_{1\sim 4}$ alkyl (meth)acrylate.

3. A process as defined in claim 1 wherein the hydrophilic monomer other than a carboxylic acid is acrylamide or methacrylamide.

4. A process as defined in claim 1 wherein the hydrophilic monomer other than a carboxylic acid is dimethylaminoethyl acrylate or dimethylaminoethyl methacrylate.

5. A process as defined in claim 1 wherein the emulsifier has a molecular weight of about 10,000 to 1,000,000.

6. A process as defined in claim 1 wherein the emulsifier is contained in water or in a hydrophilic medium in an amount of 0.1 to 20% by weight.

7. A process as defined in claim 1 wherein the hydrophilic melamine-formaldehyde resin type precondensate is melamine-formaldehyde resin precondensate, methylated product thereof, modified products with other amines, phenols, aldehydes or anionic-, cationic- or nonionic-modifier.

8. A process as defined in claim 1 wherein the hydrophilic melamine-formaldehyde resin type precondensate is used in an amount of 2 to 40 parts by weight in terms of melamine per 100 parts by weight of the hydrophobic core material.

9. A process as defined in claim 1 wherein the precondensate is added to the system at a temperature of 65° C. or higher.

10. A process as defined in claim 1 wherein the microcapsules are prepared under a condition of maintaining the reaction system at a pH of up to 5.0 and at least 60° C. for more than 2 hours.

* * * * *